Aug. 13, 1946.    O. SCHAERER    2,405,856
AUTOMATIC MILLING MACHINE FOR CUTTING TEETH IN RACK
BLANKS AND TRANSVERSELY GROOVING THE WORK
Filed Sept. 24, 1942    5 Sheets-Sheet 1
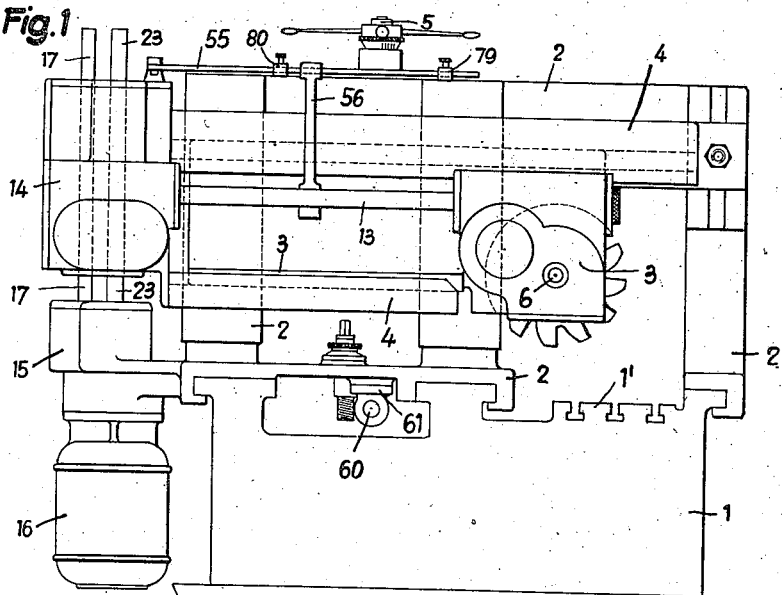
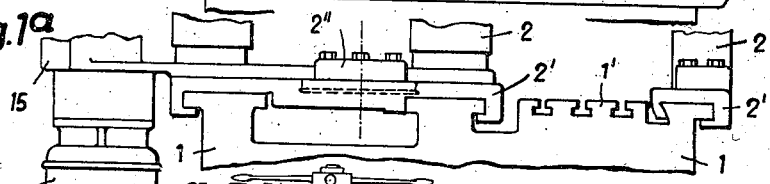
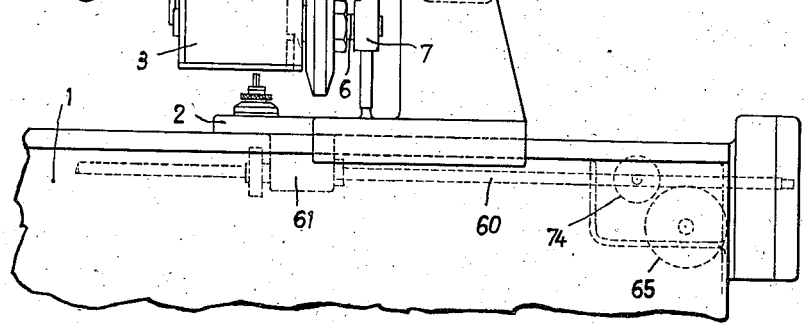

Aug. 13, 1946.  O. SCHAERER  2,405,856
AUTOMATIC MILLING MACHINE FOR CUTTING TEETH IN RACK
BLANKS AND TRANSVERSELY GROOVING THE WORK
Filed Sept. 24, 1942  5 Sheets-Sheet 2
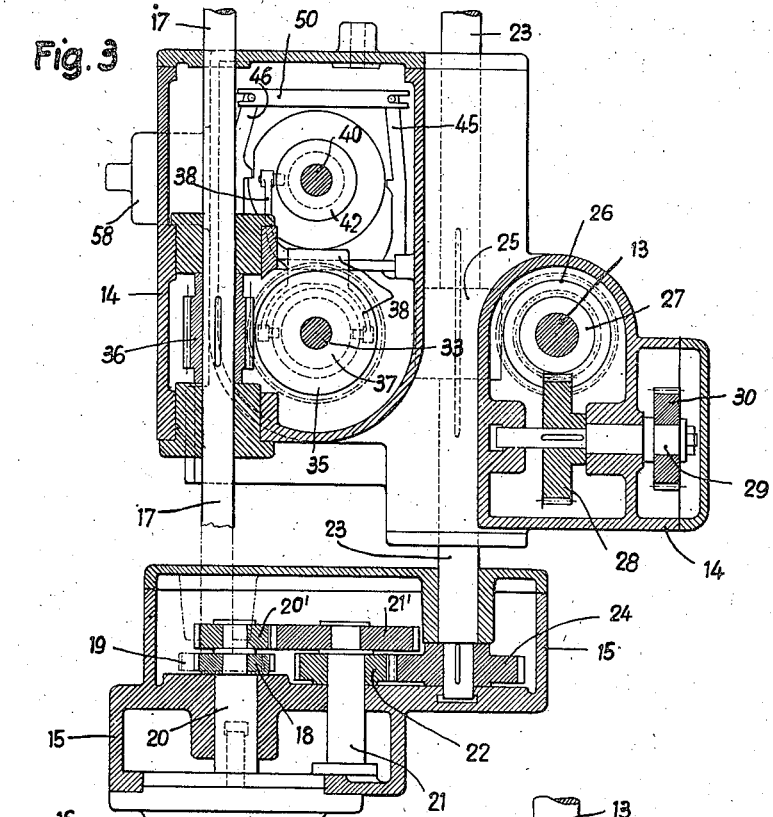
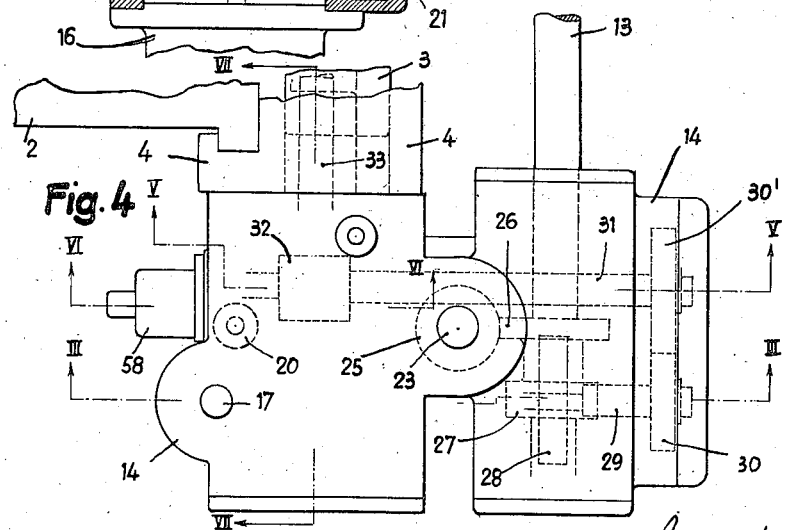

Aug. 13, 1946.  O. SCHAERER  2,405,856
AUTOMATIC MILLING MACHINE FOR CUTTING TEETH IN RACK
BLANKS AND TRANSVERSELY GROOVING THE WORK
Filed Sept. 24, 1942  5 Sheets-Sheet 3

Inventor:
O. Schaerer
By C. F. Obendorff
Atty.

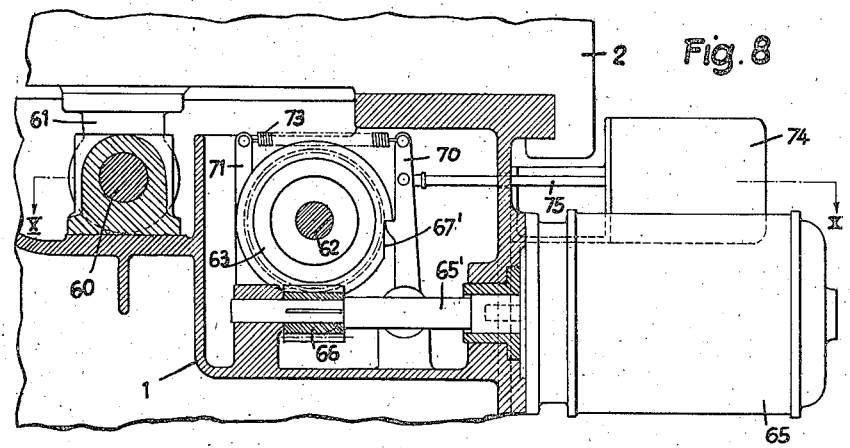
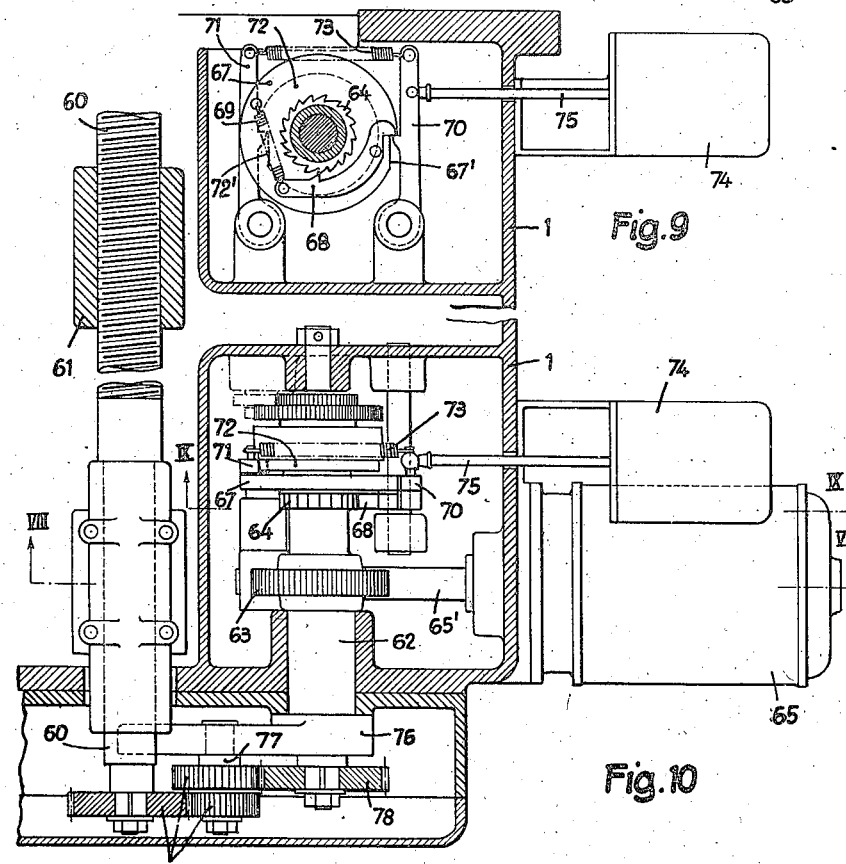

Aug. 13, 1946.   O. SCHAERER   2,405,856
AUTOMATIC MILLING MACHINE FOR CUTTING TEETH IN RACK
BLANKS AND TRANSVERSELY GROOVING THE WORK
Filed Sept. 24, 1942   5 Sheets-Sheet 5
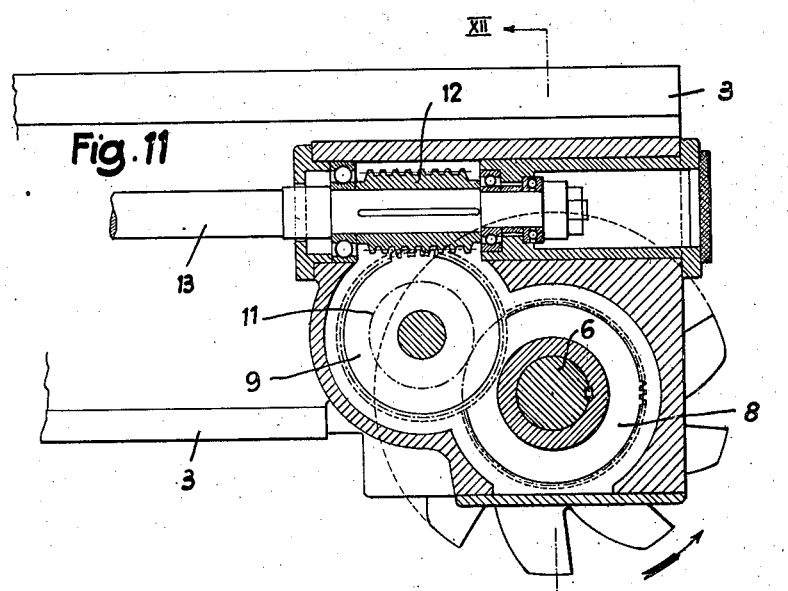
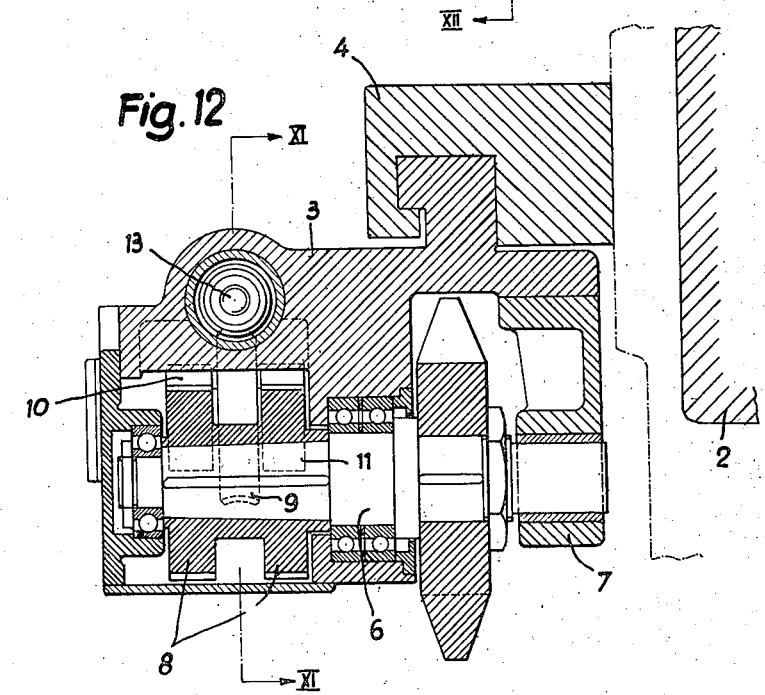

Patented Aug. 13, 1946

2,405,856

UNITED STATES PATENT OFFICE 2,405,856

AUTOMATIC MILLING MACHINE FOR CUTTING TEETH IN RACK BLANKS AND TRANSVERSELY GROOVING THE WORK

Otto Schaerer, Basel, Switzerland

Application September 24, 1942, Serial No. 459,554
In Switzerland October 4, 1941

4 Claims. (Cl. 90—9)

The present invention has for its object to provide an automatic milling machine for cutting teeth in rack blanks and transversely grooving the work.

Rack blank milling machines known heretofore so operate that the cutter is fitted in a carriage movable mostly vertically while the rack blank is clamped vertically on a carriage shiftable parallel to the cutter axis, whereby the work effects the dividing motion.

This arrangement of cutter and work presents the great disadvantage due to the work effecting the dividing motion of calling for a machine having a length at least equal to twice the work to be milled so that the machine is cumbersome and of expensive manufacture. As the structural length of such a machine is limited, long rack blanks cannot be milled with one setting only. Moreover, the supervision of the tool and work during clamping, setting and actual operation proves to be extremely difficult because the tool and work are concealed behind a setting up table and are hidden from the operator's eyes.

It is an object of the present invention to provide a new or improved milling machine obviating the aforesaid disadvantage and particularly well adapted for milling rack blanks and transversely grooving them, this result being obtained due to the fact that the work is at rest because the work-clamping table is stationary while the tool effects the continuous dividing motion, whereby the machine merely requires to have an additional length equal to the length of the tool-supporting carriage exceeding the length of cut milled in the work.

Another object of the invention is to provide a new or improved milling machine as aforesaid wherein the cutter-holding carriage is imparted a uniform and non-overhanging guiding effect and the machine is given generally speaking such a rigidity as to enable the milling operation to be conducted without jerks even where the rack blank teeth are of large size and the diameters of the milling cutters must be correspondingly large.

Yet another object of the invention is to provide a new or improved milling machine as aforesaid wherein a rigid drive is ensured together with a limited volume due to the transmission of the operational force to the cutter arbor or spindle through a double gear unit keyed thereto and actuated by a pair of spur wheels integral with a worm wheel and of smaller size than said gear, this worm wheel meshing between the individual gear elements of the double gear unit.

A further object of the invention is to provide a new or improved milling machine as aforesaid wherein in order to obviate long shafts and the otherwise unavoidable clearances for operating the dividing mechanism, particularly where the machine structure involves milling ranging over several meters, magnetic means energized at the proper time by a controller on the cutter-holding carriage are provided for operating a lever for setting the dividing plate and also setting said dividing mechanism into operation by the action of a motor specially allocated for this purpose.

A still further object of the invention is to provide a new or improved milling machine as aforesaid wherein said special motor is used for the actuation of the cutter spindle and also for the forward and backward drive of the cutter-holding carriage, thereby avoiding long transmission shafting and lessening the overall size of the machine.

With these and such other objects in view as will incidentally appear hereafter, the invention comprises the novel construction, combination and arrangement of parts that will now be described in detail with reference to the accompanying diagrammatic drawings exemplifying a suitable constructional embodiment of the same and forming a part of the present disclosure.

The annexed drawings represent, by way of example, embodiments of the improved milling machine.

Figure 1 is a front view of the machine.

Figure 1ª is a fragmentary view showing a modification of the machine.

Figure 2 is a side view of the machine.

Figure 3 is a vertical section view of the cutter setting mechanism along the line III—III of Figure 4.

Figure 4 is a plan view of the cutter setting mechanism.

Figure 8 is a vertical sectional view through the dividing mechanism along the line VIII—VIII of Figure 10.

Figure 9 is a vertical sectional view through the same mechanism along the line IX—IX of Figure 10.

Figure 10 is a horizontal sectional view of the dividing mechanism along the line X—X of Figure 8.

Figure 11 is a vertical sectional view through the cutter spindle drive along the line XI—XI of Figure 12.

Figure 12 is a vertical sectional view through the same drive along the line XII—XII of Figure 11.

Figure 5:
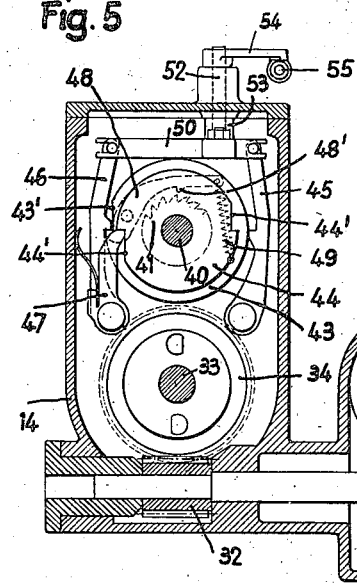
Figure 5 is a vertical sectional view along the line V—V of Figure 4.

As illustrated in Figures 1 and 2, the automatic milling machine shown comprises a bed 1 fitted with threefold guiding means for a bridge-shaped standard carriage 2. The longitudinal front part of said bed is so built as to form an elongated supporting table 1' for the work which must be cut out or milled into the shape of a rack. The carriage 2 has mounted thereon a horizontal auxiliary carriage 4 adjustable in the vertical direction by means of a screwed spindle 5. The carriage 4 supports the cutter-holding carriage 3 adjustable vertically of the supporting table 1' and in which is mounted in ball bearings the cutter spindle 6 whose outermost end is abutted against a counter-bearing 7 (see Figures 11 and 12). The cutter spindle 6 has keyed thereon a double gear 8 whose teeth mesh with spur wheels 10, 11 of smaller size than the gear 8 and formed integral with a worm wheel 9 interposed therebetween. The worm wheel 9 which is mounted together with the spur wheels 10, 11 on a stub shaft meshes in turn with a worm 12 keyed upon a horizontally extending power shaft 13. This shaft is driven through a mechanism (to be described hereafter) arranged in a casing 14 located on the rear longitudinal side of the machine and secured to the carriage guide 4.

The standard carriage 2 is guided on both sides of the work-holding table, its part extending towards the side of and over the said table being guided by a bracket on said carriage 2.

Under the casing 14 the standard carriage 2 is provided with a driving gear casing 15 (see Figures 1 and 3) to the lower side of which is secured a driving electric motor 16. The shaft of this motor 16 is connected by a tongue and slot connection with a hollow shaft 20 arranged in the casing 15 and carrying a pinion 18 meshing with a spur wheel 19 secured to a vertical shaft 17 for the return of the cutter-holding carriage 3. Inside the casing 15 extends parallel to the hollow shaft 20 an auxiliary shaft 21 driven by spur wheels 21', 20' removably fitted on its upper end and on the upper end of the shaft 20 respectively. The auxiliary shaft 21 has keyed thereto a spur wheel 22 meshing with a companion spur wheel 24 keyed to the lower end of a vertical driving shaft 23. A worm 25 arranged in the casing 14 is splined on the shaft 23 and meshes with the worm wheel 26 of a combined worm and screw gear 26, 27 (see also Figure 4). The screw wheel 27 meshes in turn with a companion wheel 28 keyed to a change wheel shaft 29. Owing to change wheels 30, 30' (Figures 3 and 5) the rotational motion of the shaft 29 is transmitted to a change wheel shaft 31 and thence through a worm 32 keyed thereon to a worm wheel 34 fitted on a conveyor shaft 33. A worm and spur gear 35 loosely mounted on the shaft 33 receives a constant impulse through a worm 36 fast on the vertical shaft 17 (Figure 3).

Figure 7:
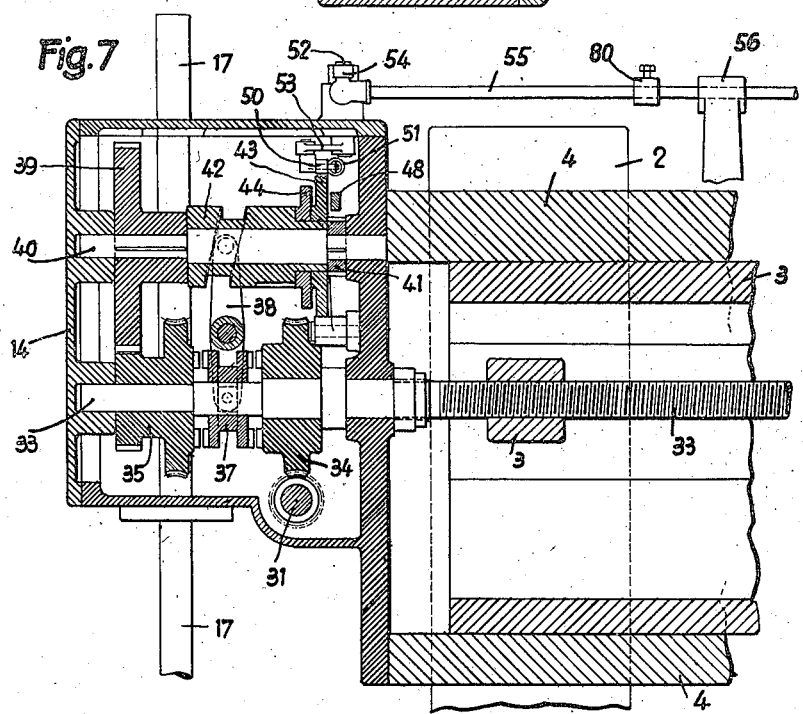
Figure 7 is a vertical sectional view along the line VII—VII of Figure 4.

The shaft 33 furthermore carries a shiftable claw coupling 37 (Figure 7) operated by means of a coupling fork 38 and capable of being alternatively brought into engagement with the worm wheel 34 for driving the cutter-holding carriage 3 and with the worm wheel 35 for returning said carriage 3. The worm and spur gear 35 drives a spur wheel 39 keyed to an auxiliary shaft 40. Upon said shaft 40 is rigidly supported a ratchet wheel 41 having sawteeth (Figures 5 and 7) and between the wheel 41 and the spur wheel 39 is loosely provided a cam 42 adapted to rock the coupling fork 38. The cam 42 has a hub portion rigidly supporting a dividing plate 43 and a counter-plate 44. The plate 43 is associated with setting levers 45, 46 engageable by cam parts in a notch 43' formed in the plate 43 so as to hold it after each half revolution as well as the cam 42. The counter-plate 44 provided with a pair of notches 44' offset by 180° is associated with a spring-urged pawl 47 whose engagement with either of the notches 44' prevents in each instance the plates 43, 44 and the cam 42 integral therewith from revolving back. The dividing plate 43 carries a rock lever 48 fitted at one end with a hook cooperable with the cam portions of the setting levers 45, 46 and having its other end so engaged by a traction spring 49 as to bring a dog 48' thereon into engagement with the ratchet wheel 41. Both setting levers 45, 46 are interlinked by a pivotal bar 50 and draggingly urged together by a traction spring 51 (Figure 7).

With a view to the alternative actuation of the setting levers 45, 46 in unison with the operative and idle strokes of the cutter-holding carriage 3, there is provided thereon an arm 56 which serves at the same time as an abutment for an operating rod 55 and cooperates with a pair of stops 79, 80 (Figures 1 and 7) adjustable along said rod 55. The latter is connected to a lever 54 fitted upon the upper end of a vertical pin 52 whose lower end carries a lever 53 (Figures 5 and 7) operatively connected to the bar 50.

Figure 6:
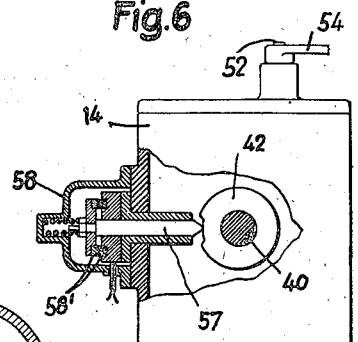
Figure 6 is a fragmentary vertical sectional view on the line VI—VI of Figure 4.

Secured to the gear casing 14 (Figures 3 and 6) is a switch 58 adapted to control the standard carriage 2 and provided with a control pin 57 connected to its movable contact 58' and cooperating with the above-cited cam 42. Closing of the switch 58 at every other half revolution of the cam 42 trips into transient operation an electromagnet 74 (Figure 2) secured to one end of the machine bed 1 which in turn switches in through an operating rod 75 the mechanism shown in Figures 8, 9, 10 and controlling the standard carriage 2. The said mechanism which is accommodated in the machine bed end adjacent the electromagnet 74 is provided with a change wheel shaft 62 (Figure 10) loosely connected to a worm wheel 63 formed integral with a ratchet wheel 64 and meshing with a worm 66 fast upon the constantly revolving power shaft 65' of an electric motor 65.

The shaft 62 carries, moreover, a dividing plate 67 and a counter-plate 72 (Figures 8 and 9) with which cooperate in turn setting levers 70, 71 draggingly urged together by a traction spring 73. A cam on the setting lever 70 is engageable into a notch 67' in the plate 67 while a cam on the setting lever 71 is engageable into a notch 72' in the counter-plate 62. The dividing plate 67 carries a rock lever or pawl 68 one end of which is urged by a traction spring 69 into rocking tendency so as to bring a dog thereon into mesh with the ratchet wheel 64. This action is, however, precluded as long as the other hook-shaped end of the lever 68 remains in engagement with the came on the setting lever 70 connected in turn with the operating rod 75 of the electromagnet 74. After each operative stroke and on completion of the return motion of the cutter-holding carriage 3, the lever 70 is disengaged from the plate 72 and from the rock lever 68 so that said plate can effect a revolution and the shaft 62 is also revolved in the same direction and to the same extent. The rotary motion of the shaft 62 is transmitted to the pin 60 through change wheels 78 interchangeably fitted on the ends of the shafts 62 and 60 and on an intermediate pin 77 carried by an adjusting arm 76. The shaft 60 is provided with a nut 61 connected to the standard carriage 2.

The operation of the automatic rack blank milling machine is as follows:

The work is first clamped either directly or in a suitable device on the bed platform. The cutter speed is then adjusted according to the cutter diameter or the material being cut by means of the spur wheels 18, 22 fitted on the shafts 20, 21 (Figure 3). The cutter feed per revolution of the cutter is adjusted by means of the change wheels 30, 30' removably fitted upon the shafts 29, 31 (Figure 4). The abutments 79, 80 are then adjusted along the rod 55 (Figures 1 and 7) to correspond with the cutter-holding carriage path. As soon as the cutter has traversed the work, the rod 55 acting through the medium of the lever 54, 53 and the connecting bar 50 pulls the setting lever 45 out of the notch in the dividing plate 43. This frees the pawl 48 and causes it to be dragged by the traction spring 49 into engagement with the permanently revolving ratchet wheel 41. The dividing plate 43 and cam 42 then effect half a revolution, whereupon the pawl 48 is seized by the lever 46 which falls into the notch and is withdrawn from the ratchet wheel 41, and the dividing plate 43 is prevented from further rotating. The counter-pawl 47 stops the dividing plate 43 and counter-plate 44 from eventually revolving back under the drag upon the pawl 48. While the cam 42 thus effects half a revolution, the coupling 37 (Figure 7) is acted upon by the fork 38 and set into engagement with the worm wheel 35 which revolves at a constant speed and quickly returns the cutter-holding carriage through the conveyor shaft 33. Said carriage is thus quickly dragged back to its original position.

Before reaching this end position, the arm 56 on the cutter-holding carriage impacts the abutment 80 on the rod 55 and the lever 46 is disengaged by the levers 53, 54 and the bar 50 from the dividing plate 43, while the pawl 48 is brought into engagement with the revolving ratchet wheel 41 and the said plate 43 and cam 42 are rotated by a further half revolution until the lever 45 trips into the dividing plate 43 and releases the pawl 48. This half revolution of the cam 42 actuates the contact pin 57 by causing the same to be urged by the spring into the cam notch, whereby the contacts are closed for a short time so that the energized magnet 74 can drag the setting lever 70 forming part of the dividing mechanism (Figure 9) out of the dividing plate 67 and set it into rotation as will be described more in detail hereafter. Selection is purposely made of a system wherein the contact is urged into operation by spring action responsive to positive disengagement instead of conversely because should the spring action fail to operate, the dividing mechanism is not set into operation and the cutter functions in the previous tooth space so that a damaging effect is precluded.

The ratchet wheel 64 loosely mounted on the change wheel shaft 62 and fitted with a worm wheel 63 is imparted a constant rotational speed by the worm 66 fast upon the power shaft 65'. The dividing plate 67 and the counter-plate 72 which are keyed to the change wheel shaft 62 are brought into proper position while the pawl or dog on the lever 68 is simultaneously brought out of engagement with the ratchet wheel 64 by both setting levers 70, 71.

As the magnet 74 is energized as above described, the setting lever 70 is dragged out of the dividing plate 67 while the pawl 68 is spring urged into engagement with the ratchet wheel 64 which is constantly revolved by the motor 65 specially allocated therefor. As a result of this, the dividing mechanism is set into motion and the dividing plate 67 can effect a full revolution, whereupon the setting lever 70 again engages the notch in the dividing plate 67 and the pawl 68 is disengaged from the ratchet wheel 64. The spindle then moves the cutter-holding carriage by one more tooth. The counter-pawl 71 is simultaneously engaged into the return notch of the counter-plate 72, so that the dividing plate 67 always assumes the same exactly determined position. This process repeats itself after each operative stroke of the cutter-holding carriage 3.

A device which is not described in detail enables the dividing plate 67 to effect several revolutions before the setting lever 70 can drop into the notch, thereby making the operation possible even in the case of coarse divisions with small driving change wheels and large driven change wheels.

In Figure 1ª is shown a structural modification of the arrangement of the standard carriage 2. According to this modification, said carriage is angularly adjustable on an auxiliary slide 2', the latter being slidably mounted on the bed 1 by means of three guideways, as shown in Figure 1ª. The carriage 2 is mounted on the slide 2' by means of a pivot bearing 2'', so as to be able to describe a limited rotary movement about the pivoted axis represented by a dot and dash line in Figure 1ª. The inverted T-shaped guides are severally arcuate in character, the extent of the arc determining the limits of angular displacement of the carriage 2. Clamping bolts may retain the parts in adjusted position in conventional manner. This makes it possible to also mill oblique teeth to true shape.

Minor constructional details may be varied without departing from the scope of the subjoined claims.

What I claim is:

1. In an automatic rack milling machine, a stationary bed frame supporting an electric motor, a work-clamping table rigid with said frame, a bridge-shaped standard carriage movable lengthwise on the table, longitudinal slideways for said carriage on one side of the table and an auxiliary longitudinal slideway on the other side of the table, a vertically adjustable cutter-holding carriage traversable across the table transversely relative to said slideways, actuating means on the standard carriage for the cutter and cutter-holding carriage, and means for correlating movements of said standard carriage with movements of said cutter-holding carriage comprising a dividing mechanism supported at one end of the bed frame, said mechanism including a dividing spindle actuated by said motor, a notched dividing plate, a setting lever having a cam cooperable with the plate notch, a ratchet wheel on the plate shaft positively driven by the motor, and magnetic means associated with said lever and temporarily interconnecting said plate and wheel responsive to operation of the cutter and carriage.

2. In an automatic rack milling machine, a stationary bed frame supporting an electric motor, a work-clamping table rigid with said frame, a bridge-shaped standard carriage movable lengthwise on the table, longitudinal slideways for said carriage on one side of the table and an auxiliary longitudinal slideway on the other side of the table, a vertically adjustable cutter-holding carriage traversable across the table transversely relative to said slideways, actuating means on the standard carriage for the cutter and cutter-holding carriage, and means for correlating movements of said standard carriage with movements of said cutter-holding carriage comprising a dividing mechanism supported at one end of the bed frame, said mechanism including a dividing spindle actuated by the motor, notched dividing plate and counterplate, spring-urged pivotable setting levers having cams cooperable with the plate notches, a ratchet wheel on the plate shaft positively driven by the motor, an electromagnet associated with said levers and temporarily interconnecting said plates and ratchet wheel, and a change wheel gear so associated with the dividing spindle as to correlate the operation of the dividing mechanism and the step-by-step motion of the standard carriage.

3. In an automatic rack milling machine, a stationary bed frame supporting an electric motor, a work-clamping table rigid with said frame, a bridge-shaped standard carriage movable lengthwise of the table, longitudinal slideways for said carriage on one side of the table and an auxiliary longitudinal slideway on the other side of the table, a vertically adjustable cutter-holding carriage traversable across the table transversely relative to said slideways, actuating means on the standard carriage for the cutter and cutter-holding carriage, and means operated by said electric motor for continuously correlating movements of said standard carriage with movements of said cutter-holding carriage.

4. In an automatic rack milling machine, a stationary bed frame supporting an electric motor, a work-clamping table rigid with said frame, a bridge-shaped standard carriage mounted for limited rotary movement relative to said table, arcuate longitudinal slideways for said carriage on one side of the table and an auxiliary arcuate longitudinal slideway on the other side of the table, a vertically adjustable cutter-holding carriage traversable across the table transversely relative to said slideways, actuating means on the standard carriage for the cutter and cutter-holding carriage, and means operated by said electric motor for continuously correlating movements of said standard carriage with movements of said cutter-holding carriage.

OTTO SCHAERER.